A. P. BRUSH.
TRANSMISSION MECHANISM FOR STARTING AND LIGHTING APPARATUS.
APPLICATION FILED FEB. 1, 1915.

1,196,927. Patented Sept. 5, 1916.

Witnesses
E. B. Gilchrist

Inventor
Alanson P. Brush
by
Thurston & Kwis
attys.

UNITED STATES PATENT OFFICE.

ALANSON P. BRUSH, OF DETROIT, MICHIGAN.

TRANSMISSION MECHANISM FOR STARTING AND LIGHTING APPARATUS.

1,196,927. Specification of Letters Patent. Patented Sept. 5, 1916.

Application filed February 1, 1915. Serial No. 5,418.

*To all whom it may concern:*

Be it known that I, ALANSON P. BRUSH, a citizen of the United States, residing at Detroit, in the county of Wayne and State of Michigan, have invented a certain new and useful Improvement in Transmission Mechanism for Starting and Lighting Apparatus, of which the following is a full, clear, and exact description.

This invention relates to starting and lighting apparatus for motor vehicles, and to that type wherein a single dynamo electric machine is employed both as a motor to start the engine and as a generator for lighting and battery charging purposes.

It is customary to provide for the dynamo electric machine either a gear drive or a chain drive through which power is transmitted between the engine and the shaft of the dynamo electric machine, both when the machine is serving as a motor and when it is serving as a generator. Although a belt drive would be the most desirable because it is the least expensive and the most silent of any of the power transmitting agencies, the belt drive has not been utilized with a machine which is to serve both as a motor and a generator, for the reason that the belt adjustment or belt tension required to transmit the heavy load when the machine is serving as a motor is not suitable for transmitting the smaller load when the machine is being driven as a generator, because it imposes unnecessary load on the bearings and the belt will be constantly stretching requiring frequent tightening, and would have short life.

The object of the present invention is the provision of means by which a belt drive may be used with high efficiency for the purpose stated. This object is attained by the invention which comprises in combination with the driving belt means which provide or permit an automatic belt adjustment when the machine is changed from a motor to a generator and vice versa, the belt tension being automatically increased when the machine becomes a motor and being automatically decreased when it becomes a generator.

My invention may be briefly summarized as consisting in certain novel details of construction and combinations and arrangements of parts which will be described in the specification and set forth in the appended claims.

Figure 1:
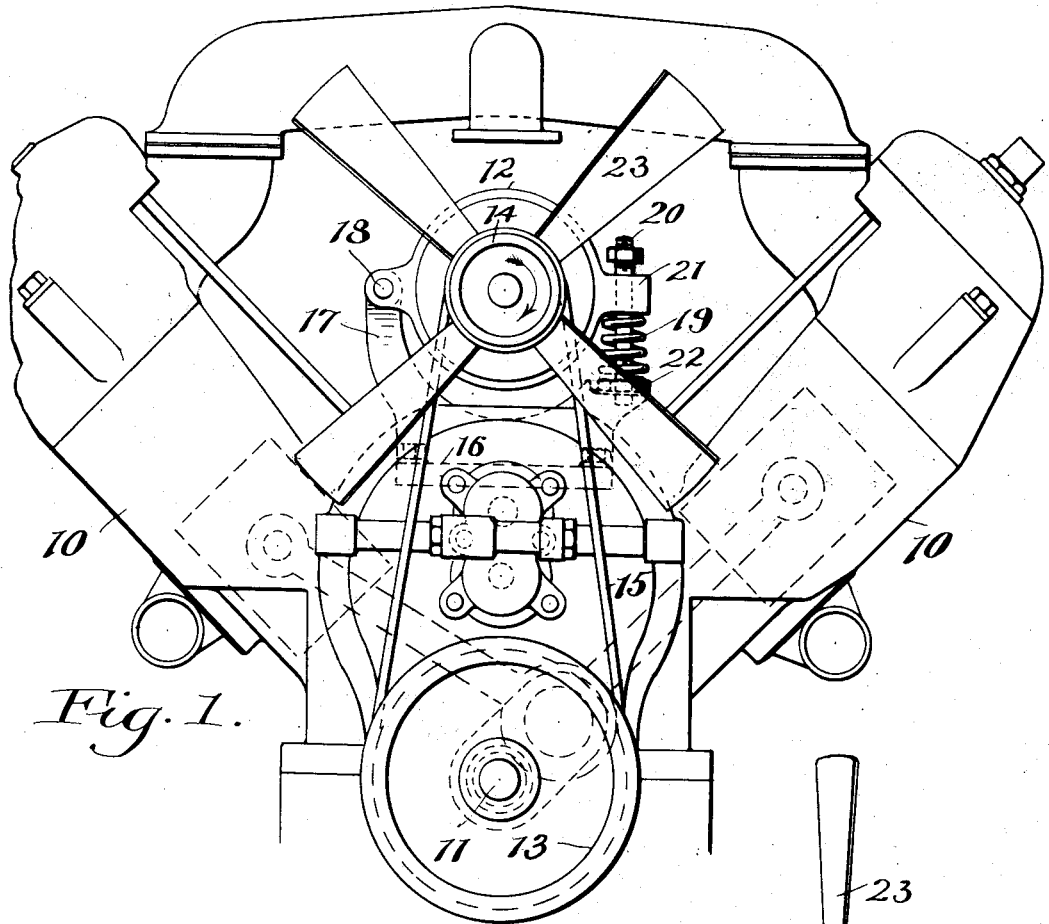
Figure 2:
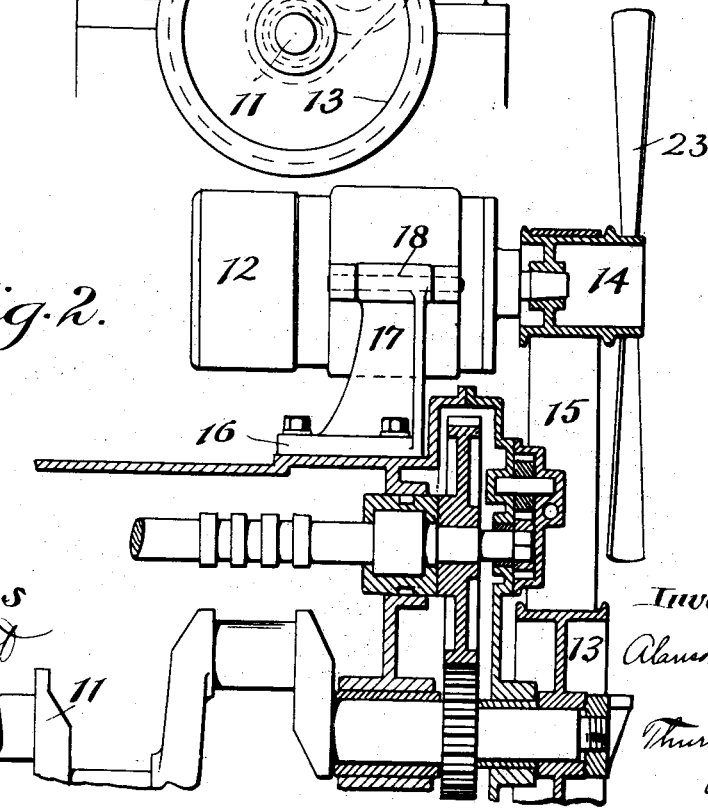

In the accompanying sheet of drawings wherein I have illustrated one embodiment of my invention, Figure 1 is a front view of a V-type engine with a dynamo electric machine supported and connected to the engine crankshaft in accordance with my invention; and Fig. 2 is a vertical sectional view of the same showing only a small portion of the engine.

In the drawings 10 represents the cylinders, of which there may be any number, these cylinders being arranged in this case in V-formation, although this type of engine is not at all material to my invention, as the ordinary arrangement of cylinders may be employed. Arranged above the crankshaft 11 of the engine in the space between the cylinders is the dynamo electric machine 12 which serves as a motor for engine starting purposes and as a generator for lighting and battery charging purposes. At the forward ends of the crankshaft and armature shaft, respectively, are pulleys 13 and 14 which are connected by a belt 15 through which power is transmitted at all times between the dynamo electric machine and engine.

In this particular embodiment of my invention, the automatic belt adjustment previously referred to is obtained by the combination of a belt tensioner and of a certain mounting of the dynamo electric machine such that the action of the belt tensioner is modified by the motor torque reaction when the machine is serving as a motor and by the magnetic pull or drag of the armature on the field member of the machine when the latter is serving as a generator. It will be observed that the dynamo electric machine is mounted on a support 16 which is secured to a part of the engine casing above the crankshaft and between the cylinders. This support is provided with an upstanding arm or bracket 17 to which the field member or housing of the dynamo electric machine 12 is pivoted by a pin or bolt 18 passing through one or more lugs on one side of the housing. The other side of the machine is yieldingly supported by a belt tensioner in the form of a spring 19 which normally tends to hold the belt taut or under predetermined tension, this spring surrounding an upstanding pin or rod 20 passing through a lug 21 on the side of the housing opposite from that on which the pivoting pin is located. Additionally, I employ means for adjusting the tension of the spring, and while this may be accomplished in numerous ways I provide in this case a nut 22 on the rod 30 by turning which the tension of the spring may be adjusted so that the normal adjustment or tension of the belt by the action of the spring alone can be varied. It is important that the motor be pivoted on the proper side of the axis of the machine and the particular side upon which it is pivoted will depend upon the direction of rotation of the armature. When the armature is rotated in the direction of the arrow of Fig. 1, or in a clockwise direction when the machine is viewed from the front, as in Fig. 1, the field element or housing should be pivoted on the left hand side, as shown, and if the armature is rotated in the reverse direction it is essential that the field member be pivoted on the opposite side to that shown.

When the machine is in operation either as a motor or generator, the particular belt tension at any time is not due alone to the pressure or tension of the spring 19, but the belt tightening action of the spring is either supplemented or opposed by the action of the armature on the pivoted field member of the machine 12, as will now be explained. Assuming that the machine is serving as a motor, the motor torque reaction tends to rotate the field member in the direction opposite to the direction of rotation of the armature. This swings the free end of the housing upwardly, and therefore increases the belt tension or assists the spring in tightening the belt. On the other hand, when the armature of the machine 12 is driven by the engine in the direction indicated by the arrow, in other words, when it is driven as the generator, the drag of the armature on the field member tends to rotate the field in the same direction that the armature is rotated; and this tends to swing the pivoted motor housing downwardly against the spring so as to decrease the belt tension. In consequence, by this arrangement there is secured, as before stated, an automatic belt adjustment or tension adjustment which provides a suitable tight belt to transmit the heavy load when the engine is being started, and which provides a relatively loose belt or decreased belt tension when the machine is being driven as a generator or when the belt is transmitting a relatively light load. I am, therefore, enabled to utilize the most desirable form of drive without any material slippage when the machine is serving as a motor and without unnecessary tension when the machine is serving as a generator. In this particular case the dynamo electric machine is connected by the belt direct to the crankshaft of the engine. It is not essential, however, that it be belted to the crankshaft, as it may be belted to an auxiliary shaft such as the magneto shaft which is geared to the crankshaft.

With the dynamo electric machine arranged as here shown, that is between the cylinders and above the crankshaft, it will be located directly in the rear of the radiator. This arrangement permits the use of the belt drive, as above described, as a means for rotating the radiator cooling fan. I, therefore, mount the radiator cooling fan 23 on the pulley 14, which, as previously stated, is secured to the forward end of the armature shaft.

While I have shown the preferred embodiment of my invention, I do not wish to be confined to the particular construction shown, but aim in my claims to cover any other arrangement or construction which includes a belt drive and by which an automatic belt adjustment is obtained when the character or function of the machine is changed, as above described.

Having thus described my invention, what I claim is:—

1. In combination with an engine, a dynamo electric machine adapted to serve as a motor to start the engine and as a generator for lighting or battery charging purposes, a belt connecting the rotary element of the dynamo electric machine to the engine, and means whereby the tension of the belt is automatically modified when it is converted from a motor to a generator.

2. In combination with an engine, a dynamo electric machine connected by a belt drive to the engine and adapted to serve as a motor to start the engine and adapted to be driven as a generator for lighting or battery charging purposes, and means whereby automatically a greater belt tension is provided when the machine is serving as a motor than when it is serving as a generator.

3. In combination with an engine, a dynamo electric machine adapted to serve as a motor to start the engine and as a generator for lighting or battery charging purposes, power transmitting means between the dynamo electric machine and engine comprising a belt through which power is transmitted both when the machine is serving as a motor and as a generator, and means providing a belt tension which is automatically increased when the machine becomes a motor and is automatically decreased when the machine becomes a generator.

4. In combination with an engine, a dynamo electric machine adapted to serve as a motor to start the engine and adapted to be driven as a generator for lighting or battery charging purposes, means for transmitting power between said machine and engine comprising a belt which is utilized as a power transmitting agency both when the machine is serving as a motor and as a generator, means providing an automatic belt adjustment so as to cause a greater belt tension when the machine is serving as a motor than when it is serving as a generator, said means comprising a spring tensioning device.

5. In combination with an engine, a dynamo electric machine adapted to serve as a motor to start the engine and as a generator, a belt connecting the dynamo electric machine to the engine and transmitting power between the same both when the machine is serving as a motor and as a generator, yieldable means providing a normal tension in the belt, and means whereby the action of said yieldable means is supplemented when the machine is serving as a motor and is opposed or decreased when the machine is serving as a generator.

6. In combination with an engine, a dynamo electric machine adapted to serve as a motor to start the engine and to be driven by the engine as a generator, said dynamo electric machine comprising an armature connected by a belt to the engine and a field element, said field element being pivoted on one side of its axis, and a spring yieldingly supporting said pivoted field element and serving as a belt tightening agency.

In testimony whereof, I hereunto affix my signature in the presence of two witnesses.

ALANSON P. BRUSH.

Witnesses:
  E. L. THURSTON,
  A. F. KWIS.